(12) United States Patent
Carlson et al.

(10) Patent No.: US 9,120,478 B2
(45) Date of Patent: Sep. 1, 2015

(54) TRANSITORY TORQUE MODIFICATIONS USING SKIP FIRE CONTROL

(71) Applicant: Tula Technology, Inc., San Jose, CA (US)

(72) Inventors: Steven E. Carlson, Oakland, CA (US); Xin Yuan, Palo Alto, CA (US); Joshua P. Switkes, Menlo Park, CA (US); Li-Chun Chien, Milpitas, CA (US)

(73) Assignee: Tula Technology, Inc., San Jose, CA (US)

( * ) Notice: Subject to any disclaimer, the term of this patent is extended or adjusted under 35 U.S.C. 154(b) by 239 days.

(21) Appl. No.: 13/963,744

(22) Filed: Aug. 9, 2013

(65) Prior Publication Data

US 2014/0045652 A1      Feb. 13, 2014

Related U.S. Application Data

(60) Provisional application No. 61/682,135, filed on Aug. 10, 2012.

(51) Int. Cl.
| | |
|---|---|
| *B60W 10/06* | (2006.01) |
| *B60W 10/11* | (2012.01) |
| *B60W 30/19* | (2012.01) |
| *F02D 41/00* | (2006.01) |
| *F16H 63/50* | (2006.01) |
| *F02D 41/14* | (2006.01) |
| *F02P 5/15* | (2006.01) |
| *F02P 9/00* | (2006.01) |
| *F02D 41/02* | (2006.01) |

(52) U.S. Cl.
CPC ............... *B60W 10/06* (2013.01); *B60W 10/11* (2013.01); *B60W 30/19* (2013.01); *F02D 41/0087* (2013.01); *F02D 41/023* (2013.01); *F02D 41/1497* (2013.01); *F02P 5/1504* (2013.01); *F02P 5/1512* (2013.01); *F02P 9/005* (2013.01); *F16H 63/502* (2013.01); *F02D 2250/18* (2013.01); *F02D 2250/21* (2013.01); *Y02T 10/46* (2013.01); *Y10T 477/677* (2015.01)

(58) Field of Classification Search
None
See application file for complete search history.

(56) References Cited

U.S. PATENT DOCUMENTS

| | | | |
|---|---|---|---|
| 4,434,767 | A | 3/1984 | Kohama et al. |
| 4,489,695 | A | 12/1984 | Kohama et al. |
| 4,509,488 | A | 4/1985 | Forster et al. |
| 4,921,064 | A | 5/1990 | Wazaki et al. |
| 5,374,224 | A | 12/1994 | Huffmaster et al. |
| 5,377,631 | A | 1/1995 | Schechter |
| 5,540,633 | A | 7/1996 | Yamanaka et al. |
| 6,158,411 | A | 12/2000 | Morikawa |
| 6,619,258 | B2 | 9/2003 | McKay et al. |
| 7,032,581 | B2 | 4/2006 | Gibson et al. |

(Continued)

*Primary Examiner* — Justin Holmes
(74) *Attorney, Agent, or Firm* — Beyer Law Group LLP

(57) ABSTRACT

Methods and devices are described that utilize skip fire techniques to rapidly meet requests for transitory changes in the output of an engine. Specifically, the fraction or percentage of the working cycles that are fired can be changed during a transitory event so that the engine delivers the desired transitory engine output. Once the transitory event is over, normal engine operation may be restored. The described techniques are useful in a variety of applications that require a relatively quick, but transitory, reduction in engine output to meet vehicle control requirements. One particularly useful application is during transmission shift events. Other representative applications include: loss of traction events, stability control events, wheel hop prevention events, etc.

23 Claims, 5 Drawing Sheets

(56) References Cited

U.S. PATENT DOCUMENTS

| | | |
|---|---|---|
| 7,063,062 B2 | 6/2006 | Lewis et al. |
| 7,086,386 B2 | 8/2006 | Doering |
| 7,128,044 B1 | 10/2006 | Doering et al. |
| 7,300,381 B2 | 11/2007 | Badillo et al. |
| 7,503,312 B2 | 3/2009 | Surnilla et al. |
| 7,532,972 B2 | 5/2009 | Kolmanovsky et al. |
| 7,577,510 B2 | 8/2009 | Fodor et al. |
| 7,930,087 B2 | 4/2011 | Gibson et al. |
| 7,941,994 B2 | 5/2011 | Surnilla et al. |
| 7,963,267 B2 | 6/2011 | Surnilla et al. |
| 8,047,961 B2 | 11/2011 | Jess et al. |
| 8,214,127 B2 | 7/2012 | Whitney et al. |
| 2002/0116099 A1* | 8/2002 | Tabata et al. .............. 701/22 |
| 2007/0032340 A1* | 2/2007 | Hrovat et al. ............. 477/107 |
| 2008/0288146 A1 | 11/2008 | Beechie et al. |
| 2010/0050993 A1 | 3/2010 | Zhao et al. |
| 2010/0286885 A1* | 11/2010 | Guggolz et al. ............ 701/70 |
| 2011/0239963 A1 | 10/2011 | Surnilla et al. |
| 2012/0221217 A1* | 8/2012 | Sujan et al. ............... 701/54 |
| 2013/0153353 A1 | 6/2013 | Teslak et al. |

* cited by examiner

TRANSITORY TORQUE MODIFICATIONS USING SKIP FIRE CONTROL

CROSS-REFERENCE TO RELATED APPLICATIONS

This application claims priority to U.S. Provisional Patent Application No. 61/682,135, filed Aug. 10, 2012, entitled "TORQUE MODIFICATIONS USING SKIP FIRE CONTROL," which is hereby incorporated by reference.

FIELD OF THE INVENTION

The present invention relates generally to engine torque management using skip fire control.

BACKGROUND

During operation of a vehicle engine, there are times when it is desirable to quickly and transitorily alter the torque output of the engine. One such occasion is during changes in transmission gear. More specifically, when changing gears it is often desirable to rapidly and dramatically decrease engine torque output during the time span of the transmission shift operation. Reducing torque during shifting is an effective way to smooth the shifting operation and to prevent damage to friction components in the transmission. Typically, when a gear shift is about to happen, the engine control unit (ECU) will decrease the engine torque by reducing airflow into the cylinder (e.g., by closing the throttle and/or reducing the valve opening duration), adjusting ignition timing advance and/or using other means. Once the shift has been completed, the adjustments are reversed, thereby restoring the engine output. Although such techniques are effective—rapidly and dramatically reducing torque using such approaches tends to reduce the efficiency of the engine during the transitions and/or adversely impact emissions. Moreover, the engine torque output may respond sluggishly to adjustment of the throttle position because of the time needed to fill/empty the intake manifold.

Another mode that requires rapid reductions in torque output is traction control. For example, a torque reduction may be needed to prevent or reduce wheel spin under less than ideal tractive conditions or in lower gears where the wheel torque may exceed the available traction. Rapid torque reductions are also used in stability control where power may be reduced when a vehicle detects certain undesirable maneuvers such as trying to accelerate quickly with the steering wheel turned too sharply or various emergency maneuvers where engine power needs to be reduced as quickly as possible. Design protocols can also call for rapid transitory torque reductions for drivability purposes (e.g., during aggressive cornering, to prevent wheel hop, etc.).

SUMMARY

Methods and devices are described that utilize skip fire techniques to rapidly meet requests for transitory changes in the output of an engine. Specifically, the fraction or percentage of the working cycles that are fired can be changed during a transitory event so that the engine delivers the desired transitory engine output. Once the transitory event is over, normal engine operation may be restored. In many circumstances, the transitory event may require a significant reduction in the engine output—although in other instances, torque increases may be desirable throughout at least a portion of the transitory event. In some circumstances, the requested engine output may vary over time such that the requested engine output that the engine is restored to at the end of the transitory event may be different than the requested engine output at the beginning of the transitory event. The described techniques are useful in a variety of applications that require a relatively quick, but transitory, reduction in engine output to meet vehicle control requirements. One particularly useful application is during transmission shift events. Other representative applications include: loss of traction events, stability control events, wheel hop prevention events, etc.

In some applications, the engine is operated in an all cylinder mode during normal operation and in a skip fire mode during the transitory event. In applications where skip fire control is being used prior to the transitory event, the desired transitory output may be delivered by rapidly changing (e.g. reducing) the firing fraction and thereafter restoring (e.g., increasing) the firing fraction after the transitory event has passed.

In some application the throttle is held substantially constant throughout the transitory event at a position substantially the same as the throttle position used to deliver the requested engine output immediately prior to the transitory event. In circumstances where it is expected that the throttle position will change between a time just prior to and just after the transitory event, the throttle position may be altered appropriately over the course of the transitory event.

In some embodiments, other engine settings (such as spark timing, valve timing etc.) may be altered in conjunction with changes in the firing fraction to deliver the desired transitory engine output.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
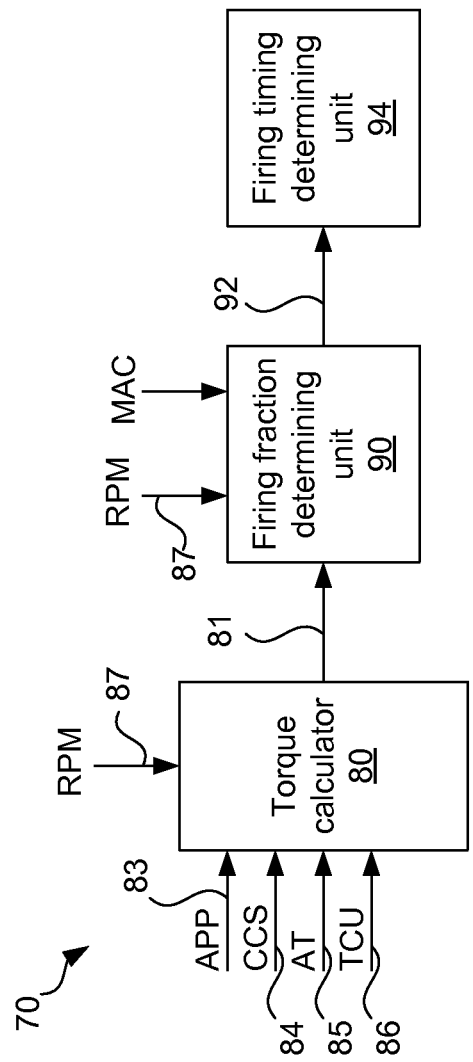
FIG. 1 is a block diagram of a skip fire engine controller suitable for implementing the described skip fire torque modulation.

The present invention relates generally to methods and devices for managing engine output during transitory events that may require significant alterations in an engine's torque output using skip fire techniques. Engine torque can be rapidly and smoothly decreased using skip fire techniques by reducing the fraction of the working chambers that are actually fired. When skip fire control is also used during normal operation of the engine, transitory requests for increased engine torque output can be made in a similar manner.

In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

When a cylinder is deactivated in a variable displacement engine, its piston typically still reciprocates, however neither air nor fuel is delivered to the cylinder so the piston does not deliver any power during its power stroke. Since the cylinders that are "shut down" don't deliver any power, the proportionate load on the remaining cylinders is increased, thereby allowing the remaining cylinders to operate at an improved thermodynamic efficiency. With skip fire control, cylinders are also preferably deactivated during skipped working cycles in the sense that air is not pumped through the cylinder and no fuel is delivered during skipped working cycles when such valve deactivation mechanism is available. Often, no air is introduced to the deactivated cylinders during the skipped working cycles thereby reducing pumping losses. However, in other circumstances it may be desirable to introduce air into a deactivated cylinder, but not to release that air from a deactivated cylinder during selected skipped working cycles. In such circumstances, the skipped cylinder may effectively act as a gas spring. Although deactivating skipped cylinders is generally preferred, it should be appreciated that in some engines or during some working cycles it may not be possible, or in some situations desirable, to truly deactivate cylinders. When a cylinder is skipped, but not deactivated, intake gases drawn from the intake manifold are effectively pumped through the cylinder during the skipped working cycle.

As discussed in the background section, there are times during operation of an engine where it is desirable to rapidly and transitorily reduce an engine's torque output. One good example of this need is during shifting of a transmission. The gear shift may take between 50 ms and 500 ms, although both shorter and longer gear shift cycles are possible. Many modern transmissions require a reduction in torque when shifting from one gear to another. These include traditional torque converter based automatic transmissions, dual clutch transmissions, automated manual transmissions and others.

Reducing torque over the time span of the transmission shift is an effective way to smooth the shifting operation and to increase the longevity of the transmission by avoiding harmful clutch slippage. Utilizing a skip-fire approach to reduce the torque during the transition has the potential advantage of keeping both the fuel efficiency and the emissions much closer to optimum during the shifting event. Moreover, skip-fire control allows rapid variation in the output torque levels, allowing accurate matching of the desired torque output throughout the gear shift. If the engine is operating at 2500 rpm, which may be a typical rpm for a gear shift, then each engine revolution takes 24 milliseconds. For an 8 cylinder, 4 stroke engine this implies a time between firing opportunities of 6 milliseconds. Torque adjustments speeds of this level are significantly faster than the gear shift cycle, allowing accurate control of the engine torque throughout the shift. As vehicles utilize an increased number of transmission gears for fuel economy and other reasons, the ability to improve the efficiency of the gear shift transition becomes increasingly important to the final fuel efficiency of the vehicle.

In skip fire control, there is normally a delay between the time a decision is made to skip or fire a particular cylinder and the beginning of the corresponding working cycle. This allows proper air management, fueling and/or deactivation of the cylinder. This can be accounted for by simply synchronizing the shift with the timing of the associated skip fire adjustments. It can also sometimes be accounted for by making predictions regarding when shifting will occur which is possible because the CAN bus has a shift imminent message. More generally, the synchronization between the shift and the skip fire control can be handled algorithmically in any suitable manner. For example, in some circumstances, an imminent shift can be used to dictate the timing of the transitory skip fire operation. In other circumstances, a desired shift can induce the transitory skip fire operation and the actual shift operation can be delayed the proper timing until the transitory skip fire operation is delivered. In still other implementations, the timing of the shift and the transitory skip fire operation can be chosen together.

Referring next to the drawings, controllers and control methods suitable for managing rapid and/or transitory torque reductions using a skip fire approach will be described. FIG. 1 is a block diagram that diagrammatically illustrates a skip fire controller arranged to facilitate torque management in accordance with one described embodiment. The skip fire controller 70 includes a torque calculator 80, a firing fraction determining unit 90 (sometimes referred to as a firing fraction calculator) and a firing timing determining unit 94. The torque calculator 80 is arranged to determine the desired engine torque at any given time based on a number of inputs. The torque calculator outputs a requested torque 81 to the firing fraction calculator 90. The firing fraction calculator 90 is arranged to determine a firing fraction that is suitable for delivering the desired torque based on the current operating conditions and informs the firing timing determining unit 94 of the firing fraction 92 that is appropriate for delivering the desired torque. The firing timing determining unit 94 is responsible for determining a firing sequence that delivers the desired firing fraction. The firing sequence can be determined using any suitable approach. In some implementations, the firing may be determined dynamically on an individual firing opportunity by firing opportunity basis as described in some of the patents incorporated below. In others, pattern generators or predefined patterns may be used to facilitate delivery of the desired firing fraction. By way of example, co-assigned U.S. Pat. Nos. 7,577,511, 7,849,835, 7,886,715, 7,954,474, 8,099,224, 8,131,445, 8,131,447 which are incorporated herein by reference and other co-assigned patent applications describe a number of skip fire controllers that are well suited for determining an appropriate firing sequence based on potentially time varying requested firing fractions and/or requested engine outputs.

The torque calculator 80 receives a number of inputs that may influence or dictate the desired engine torque at any time. In automotive applications, one of the primary inputs to the torque calculator is the accelerator pedal position (APP) signal 83 which indicates the position of the accelerator pedal. Other primary inputs may come from other functional blocks such as a cruise controller (CCS command 84), the transmission controller (AT command 85), a traction control unit (TCU command 86), etc. There are also a number of factors such as engine speed that may influence the torque calculation. When such factors are utilized in the torque calculations, the appropriate inputs, such as engine speed (RPM signal 87) are also provided or are obtainable by the torque calculator as necessary.

Further, in some embodiments, it may be desirable to account for energy losses in the drive train and/or the energy required to drive engine accessories, such as the air conditioner, alternators/generator, power steering pump, water pumps, vacuum pumps and/or any combination of these and other components. In such embodiments, the torque calculator may be arranged to either calculate such values or to receive an indication of the associated energy losses so that they can be appropriately considered during the desired torque calculation.

The nature of the torque calculation will vary with the operational state of the vehicle. For example, during normal operation, the desired torque may be based primarily on the driver's input, which may be reflected by the accelerator pedal position signal 83. When operating under cruise control, the desired torque may be based primarily on the input from a cruise controller. When a transmission shift is imminent, a transmission shifting torque calculation may be used to determine the desired torque during the shifting operation. When a traction controller or the like indicates a potential loss of traction event, a traction control algorithm may be used to determine the desired torque as appropriate to handle the event. In some circumstances, depression of a brake pedal may invoke specific engine torque control. When other events occur that require measured control of the engine output, appropriate control algorithms or logic may be used to determine the desired torque throughout such events. In any of these situations, the required torque determinations may be made in any manner deemed appropriate for the particular situation. For example, the appropriate torque determinations may be made algorithmically, using lookup tables based on current operating parameters, using appropriate logic, using set values, using stored profiles, using any combinations of the foregoing and/or using any other suitable approach. The torque calculations for specific applications may be made by the torque calculator itself, or may be made by other components (within or outside the ECU) and simply reported to the torque calculator for implementation.

A feature of the described approach is that the response to any torque modification event may readily be controlled in any manner defined by the engine control designer. In some embodiments, the desired firing fraction (and thus the effective torque output) may be varied with each firing opportunity. Accordingly, the controller designer has the ability to dictate a torque response that varies in any desired manner throughout the torque modification event. Thus, it should be apparent that regardless of how the desired torque is determined and regardless of how the profile of the desired torque varies over time, the described skip fire approach is well suited for delivering such transitory torque requests in a fuel efficient and emissions friendly manner.

Figure 2:
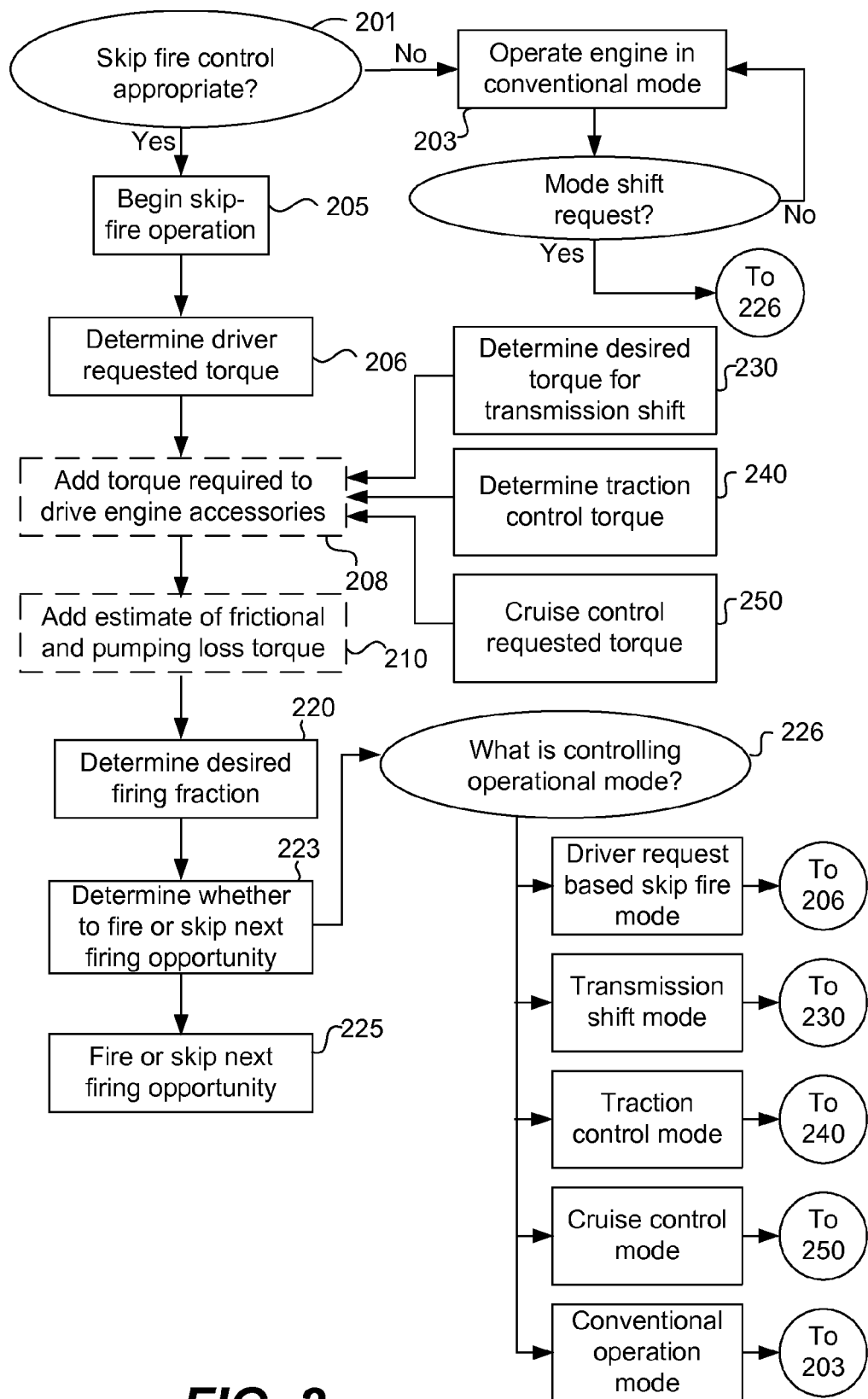
FIG. 2 is a flow chart illustrating a method of controlling engine torque output by altering the firing fraction in accordance with one described embodiment of the present invention.

Referring next to FIG. 2, one suitable method of operating an engine in a manner that utilizes firing fraction management to handle transitory torque requests will be described. Initially, in step 201 a determination is made regarding whether skip fire operation is appropriate for normal engine operation given the engine's current operating state. It should be appreciated that there are some operational conditions where skip fire control is desired and other situations where conventional operation of the engine is more appropriate. For example, although not required, at low engine speeds (e.g., at idle, or below some designated threshold such as 1500 RPM) it may be desirable to operate the engine in a conventional mode during normal operations. Additionally, at particularly high engine speeds or at high engine loads (e.g. when the accelerator pedal is near its maximum position) it may be desirable to operate the engine in a conventional mode. Similarly, it may be desirable to operate the engine in a conventional mode during engine warm-up, or in other specific circumstances. If the determination in step 201 is to operate the engine in a conventional mode, then the logic flows to step 203 where the engine is operated in the conventional, all cylinders always firing operating mode.

If skip fire operation is appropriate, the logic flows to step 205 where a skip fire operational mode is entered. When the skip fire operational mode is entered, the controller is arranged to determine which working cycles are to be fired and which working cycles are to be skipped. Preferably, when mechanically available, cylinders are deactivated during their skipped working cycles such that air is not pumped through the cylinder unless there is a specific reason to do so for operational reasons outside of skip fire control.

Once the skip fire operational mode is entered, a torque calculator (e.g. torque calculator 80) determines the driver requested torque. (Step 206). Typically, in automotive applications, the driver requested torque would be determined based primarily on the accelerator pedal position and current operating conditions such as the engine speed, however the actual approach used to determine the driver requested torque may be widely varied in accordance with the needs of any particular application.

In some applications it will be desirable to account for the energy required to drive engine accessories, such as the air conditioner, alternators/generator, power steering pump, water pumps, vacuum pumps and/or any combination of these and other components. The energy required to drive such engine accessories may be added to the driver requested torque in optional step 208 if desired. The accessory losses may be calculated by the torque calculator itself, or may be calculated by the ECU or other suitable component and reported to the torque calculator for use in the desired torque calculation. Of course, in other applications, such energy requirements can be ignored by the controller and the driver will tend to inherently compensate for these losses through adjustment of accelerator pedal position.

In some applications it will also or alternatively be desirable to account for frictional losses in the powertrain. In addition to frictional losses, the engine may experience pumping losses related to the number of operating cylinders and MAP. If desired, the negative torque caused by the frictional and pumping losses can be added to the driver requested torque in optional step 210. Like the accessory losses, the frictional and pumping losses may be determined by the torque calculator itself, or it may be determined by the ECU or other suitable component and reported to the torque calculator for use in the desired torque calculation. In other applications, the frictional and pumping losses can be ignored by the torque calculator and the driver may be relied upon to effectively compensate for such losses through appropriate selection of the accelerator pedal position. Although not specifically called out in the flow chart of FIG. 2, it should be appreciated that other adjustments to the driver requested torque may readily be made in the same manner based on any other criteria defined by the controller designer.

Once the total desired torque has been determined in steps 206-210, a firing fraction is determined that is appropriate to deliver the desired torque in step 220. The firing fraction may be based on any number of factors including the requested torque, the current engine speed, and other operating or environmental parameters, such as, the cylinder mass air charge (MAC), the transmission gear, etc.

After the firing fraction is determined a firing determination (i.e., fire or skip) is made the next working cycle in step 223. The ECU or other appropriate control mechanisms control the actual valve operations/fueling/firing or deactivation of the cylinder associated with the current working cycle (step 225). If a firing timing determining unit includes a sigma delta converter or other mechanism that has an accumulator functionality such as described in several of the incorporated, co-assigned patents, then the firings decisions can readily be made on a firing opportunity by firing opportunity basis while accounting for changes in the desired firing fraction and spreading the firings in a relatively even manner.

As long as the engine remains in the driver determined skip fire mode (as depicted by decision block 226), the logic returns to step 206 and the process is repeated for the next working cycle. In this manner, sequential working cycles are selectively fired or skipped in a manner that delivers the desired firing fraction. The selection of the timing of the skipped and fired working cycles may be made by the firing timing determining unit 94 (shown in FIG. 1) as previously described. As mentioned previously, the cylinders are preferably deactivated during skipped working cycles although this is not a requirement.

The torque determination, the firing fraction determination and the determination of whether to skip or fire a cylinder during any particular working cycle is preferably made on a working cycle by working cycle basis. That is, the torque and firing fraction determinations are preferably updated each firing opportunity and the firing decision is preferably made each firing opportunity, although again, that is not a requirement. Rather, in alternative embodiments, any of the updated calculations and/or the firing decisions may be made less frequently as appropriate for any particular skip fire controller.

There are a number of scenarios that might cause the operating mode of the engine to change from the driver torque request dictated to another mode. For example, if the controller receives an indication that a transmission shift is imminent, the logic will switch to the transmission shift torque calculating mode. In this mode, the logic flows to step 230 where a determination of the desired torque for the transmission shift is made. The transmission shift torque may be set to any value deemed appropriate by the controller designer. For example, in some implementations, the transmission shift torque may be set to a fixed value. In other circumstances, the appropriate transmission shift torque may be calculated based at least in part on various current operating parameters or the driver requested torque. For example, the transmission shift torque may be a set drop relative to the currently requested engine output (i.e., the requested engine output immediately prior to the transmission shift event), or a variable amount based on the current torque request (e.g., larger relative drops may be used when the engine is operating at higher torque outputs). In still other implementations, desired torque may follow a predetermined curve or profile that extends through the shift operation. Again, the torque reductions mandated by such curves may be relative to the current requested engine output or a set profile.

Regardless of how the desired transmission shift torque is determined, it can readily be delivered using the same process as described above for delivering driver requested torque. That is, once the desired transmission torque is determined in step 230, the logic can optionally flow to steps 208 and 210 (where accessory usage and/frictional and pumping loss torque may be accounted for if desired) and on to steps 220 et seq. where the firing fraction associated with the new torque request is calculated and the next firing decision is made (step 223) based in part on the new torque request. However, in many cases (indeed probably in most implementations), it would be preferable to simply deliver the torque determined in step 230 and the logic would flow directly to step 220 from step 230.

As long as the automatic transmission control unit (or other component responsible for managing the gear shift operation) indicates that the transmission shift torque mode is still appropriate, the logic will return to step 230 as depicted by decision block 226 and the process will repeat using torque requests that are appropriate for the transmission shift. When the transmission shift is completed, the mode decision block will cause the control logic to flow to the next appropriate operational mode. By way of example, if the engine was previously in a normal driver torque request dictated skip fire operational mode, then the logic would return to step 206 where the then current driver torque request is calculated and the process continues. Once the normal skip fire mode is reentered, the skip fire controller can almost immediately resume delivering the driver requested torque. Alternatively, if a smoother transition between the shifting torque and the driver requested torque is desired, the firing fraction can be ramped back to the driver requested torque using any desired ramping function.

In the discussion above, an example was made of the common situation where it is desirable to significantly reduce the engine torque during shifting operations. Although this is believed to be the most common situation during shifting, there may be times when a different response is desired during at least a portion of the shifting operation. For example, when downshifting a transmission, it may sometimes be desirable to match the engine speed with a target transmission speed that is deemed appropriate for the lower gear being entered. Such a result can sometimes be achieved by increasing the torque at an appropriate time in the shift operation causing the engine to rev higher and thereby facilitating better RPM matching between the engine and transmission. Such a torque increase can readily be implemented by dictating the increased torque at the appropriate time in the shift operation in a manner that suddenly increases the firing fraction to quickly rev the engine to the appropriate engine speed level.

It should be appreciated that the described firing fraction management approach is very well suited for handling the types of sudden and potentially time varying torque requests that are often desirable to facilitate transmission gear shifts because the firing fraction may be changed very rapidly thereby rapidly changing the net output of then engine. Indeed, in theory, the firing fraction may be changed as often as every firing opportunity using some of the described controllers—although in practice torque request changes tend to occur less frequently. Further, it should be appreciated that the described type of engine speed control can be utilized in both automatic and manual transmissions.

Figure 3:
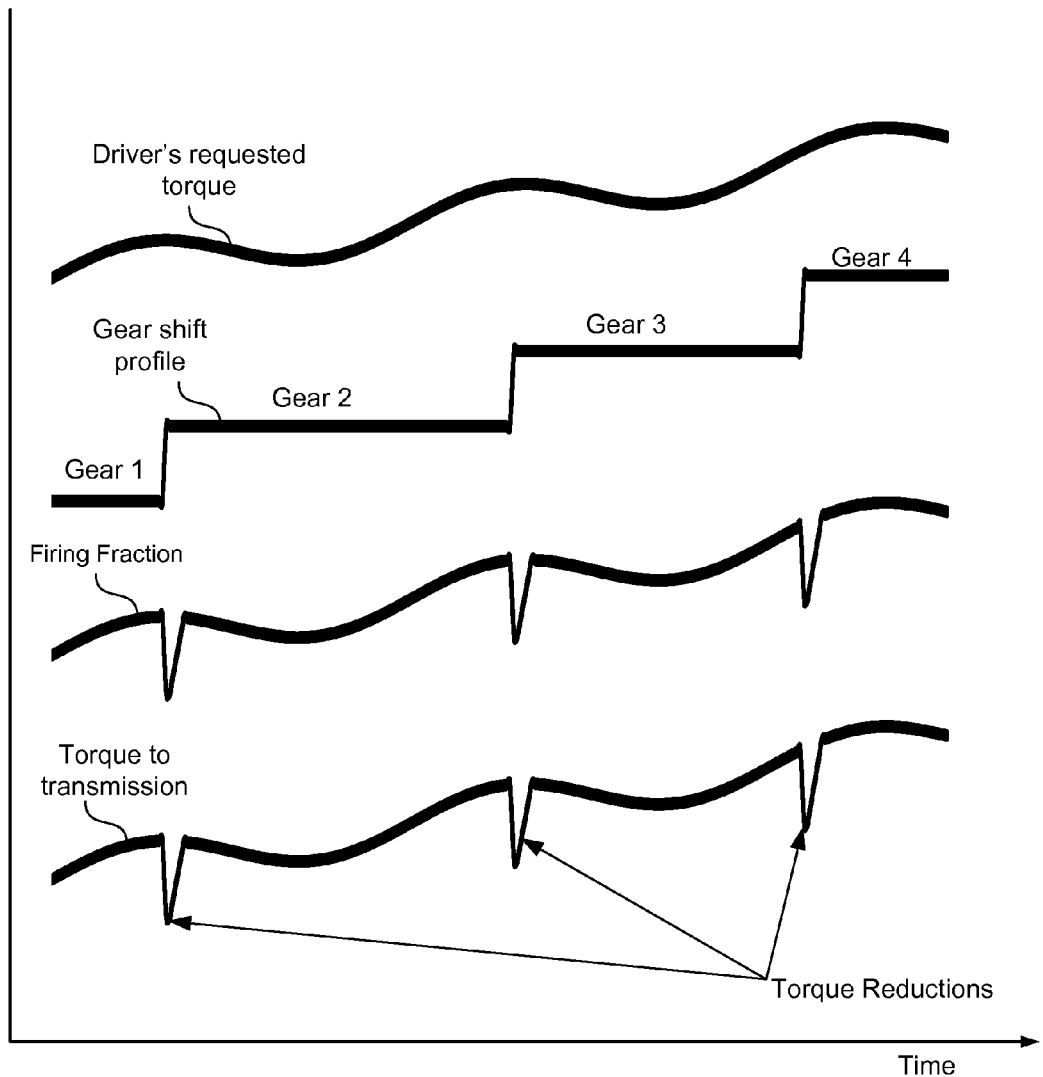
FIG. 3 is a graphic illustration of engine torque reductions and firing fraction adjustments associated with a representative series of transmission gear shifting operations.

To further illustrate the type of gear shift torque reduction that is possible using the described firing fraction management, FIG. 3 presents a series of graphs that graphically illustrate a representative driver requested torque through a series of gear shifts and the torque and firing fraction reductions that might be appropriate to facilitate such shifts. As can be seen therein, the driver requested torque may vary over time and significant torque reductions are provided during transmission shift events 315. In the illustrated embodiment, a particular deep V-shaped torque profile is desired during the shift operation. However, it should be appreciated that other profiles may be used in other embodiments.

In the example given above, the firing fraction is actively controlled during the course of a transmission shift in order to deliver the desired output. It should be appreciated that the skip fire output of the engine may be controlled in a variety of other ways as well. For example, a designated firing pattern or firing sequence may be used throughout the shift operation.

This type of approach works particularly well when the engine is operated in a conventional, all cylinder firing mode prior to the shift.

As suggested above, in skip fire control, there is normally a delay between the time a decision is made to skip or fire a particular cylinder and the beginning of the corresponding working cycle. This allows for proper air management, fueling and/or deactivation of the cylinder. The length of the delay will vary with implementation, but delays on the order of two rotations of the crankshaft are not uncommon. Preferably the ECU or skip fire controller is arranged to coordinate with the transmission controller to schedule the torque reduction and the shift operation such that they are properly synchronized.

Another operational mode in the illustrated embodiment is the traction control mode. In the illustrated traction control mode, a traction control block is arranged to determine when any of the wheels begin to spin. If wheel slippage is detected, the traction control block informs the torque calculator and the controller transitions to the traction control mode at the next mode decision block 226 and the control logic proceeds to step 240 where the desired traction control torque is determined. As with the other torque calculations, the traction control torque may be determined in any suitable manner. For example, in some circumstances, the traction controller may request a relative torque reduction. That is, the traction controller may request that the torque calculator reduce the torque by a specific amount relative to the driver's requested torque. In other circumstances, the traction controller may request a specific torque output. In still other circumstances, the traction controller may request a specific torque at the wheels (as for example zero torque at the wheels). Regardless of how the request is made, the torque calculator calculates or otherwise obtains the current traction torque request in step 240.

Once the desired traction control torque is determined in step 240, the logic can flow to optional steps 208 and 210 (where accessory usage and/frictional and pumping loss torque may be accounted for if desired) and on to steps 220 et seq. where the firing fraction associated with the new torque request is calculated and the next firing decision is made (step 223) based in part on the new torque request as previously discussed. As long as the traction control unit (or other component responsible for managing the vehicle) indicates that the traction control mode is still appropriate, the logic will continue to return to step 240 as depicted by decision block 226 and the process will repeat using torque requests that are directed by the traction control unit. When the traction control event is completed, the mode decision block will cause the control logic to flow to the next appropriate operational mode (e.g., a normal driver torque request dictated skip fire operational mode).

It should be appreciated that when the traction control unit is arranged to inform the torque calculator of the of the torque that is desired to be actually delivered to the wheel, it may be particularly desirable to include the accessory usage and/frictional and pumping loss torque addition steps 208 and 210 so that the engine provides the amount of torque that is appropriate to insure that the desired wheel torque is delivered to the wheels. A particular situation where this may be important is when a vehicle loses traction; for example, spinning or sliding on ice. Wheel speed sensors located on both the driven and non-driven wheels can detect an imbalance in the wheel rotation rates indicative of loss of traction. In this event engine control may pass to the tractive requested torque block 240. The tractive requested torque block 240 may request a decrease or an increase in the engine torque (depending upon the circumstances of the spinning or sliding event, so that the rotation speed of the drive wheels more closely matches the rotation speed of the non-drive wheels. Once traction has been restored the control algorithm can return to use of the driver requested torque. Use of the skip-fire control algorithm shown in FIG. 2 allows the adjustment of the engine torque more quickly and accurately than prior art control methods.

Figure 5:
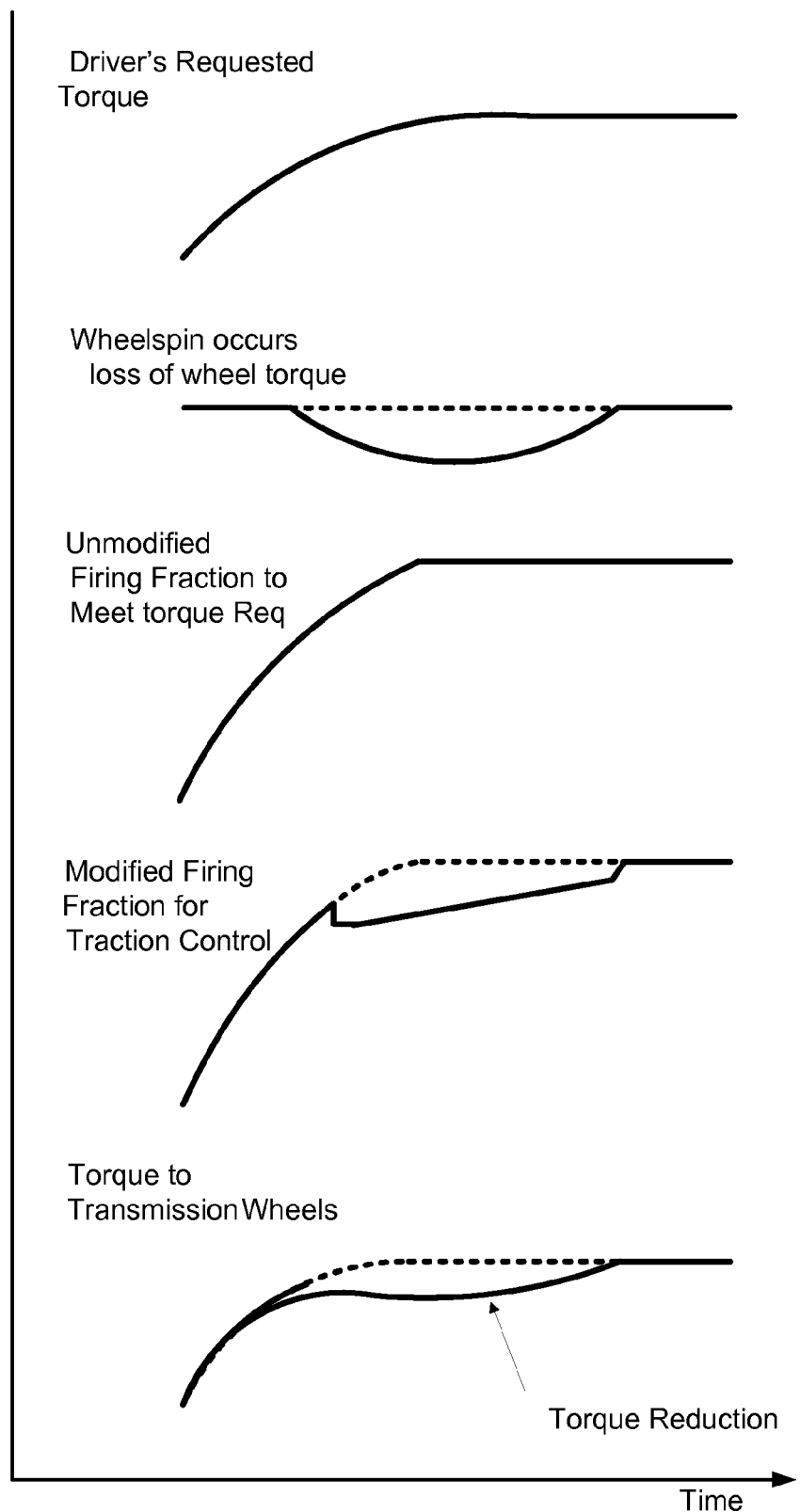
FIG. 5 is a graphic illustration of engine torque reductions and firing fraction adjustments associated with a representative traction control event.

To further illustrate the type of traction torque control that is possible using the described firing fraction management, FIG. 5 presents a series of graphs that illustrate a representative driver requested torque through a representative loss of traction event together with a firing fraction modification that might be an appropriate response to the loss of traction event and the resulting torque transmitted to the wheels.

Unlike transmission shift events which can typically be scheduled, the time delays associated with scheduling skip fire operation can adversely affect the ability to deliver the desired response during a traction control event. Accordingly, in some circumstances, it may be desirable to utilize fuel-cutout based skip fire for some or all of the working cycles during the traction event. In fuel cut-out (also sometimes referred to as cylinder cut-out), a cylinder is simply not fueled when fuel injection would normally occur even though air is introduced to the associated cylinder. This can be helpful to reduce the delay time necessary to deactivate the cylinder. That is, the engine output can be dropped almost immediately by not fueling a working cycle even when it is not possible to deactivate the cylinder by disabling air intake. It should be appreciated that cylinder cut-out generally results in unburnt air being pumped through the cylinder, which is typically undesirable from an emissions standpoint. Therefore, it is often preferable to deactivate the cylinders during skipped working cycles when that is practical. However, if scheduling delays prevent deactivation of one or more of the first available working cycles at the beginning of a traction control event, then fuel cut-off can be used for one or more of such working cycles to speed-up the implementation of skip fire based response. Preferably cylinder deactivation is utilized when it becomes available. Although the use of fuel cut-off is described in the context of traction control events, it should be appreciated that the same approach can be used to speed the implementation of any torque reduction event.

In still other implementations, it may be desirable to alter the spark timing (or other engine parameter(s)) in conjunction with a reduction in firing fraction to even more quickly alter the effective torque output and/or to more precisely control the torque output during a traction control event. As is well understood in the art, spark timing adjustments are particularly suitable because changes in the spark timing can significantly impact the output of any particular firing and can be implemented very rapidly.

Although only two torque modification scenarios have been described in detail (e.g., transmission shifting torque reductions and traction control torque modifications) it should be appreciated that there are a variety of other control scenarios where rapid and/or transitory torque modifications may be dictated by an engine control algorithm rather than the driver. For example, very rapid torque reductions are used in various stability control applications where power may be reduced when a vehicle is subjected to certain maneuvers such as trying to accelerate quickly when the steering wheel is turned too sharply or in emergency maneuvers where engine power needs to be reduced instantly. In motorcycle applications, one type of stability control feature may be wheelie prevention. The torque can also be reduced to address drivability issues. For example, when there is a sudden and significant increase in the requested torque, a tapered torque increase may be desired to reduce the risk of ringing of the driveline which may occur if torque is applied too quickly (e.g., if a torque increase is applied to quickly, the elasticity of the driveline can reflect the torque impulse causing the entire vehicle to shuffle (move back and forth) after the torque transition). Yet another application is in the control of wheel hop (which is another type of traction control event that can sometime occur when sudden, large changes in the torque are requested). In each of these scenarios, the torque fluctuations can readily be delivered by adjusting the firing fraction in the described manner.

An operational mode that may require an increase in the delivered torque is an up-hill holding mode. In this instance a control block may be arranged to prevent a vehicle with an automatic transmission and torque converter from rolling backwards down a hill by monitoring the wheel speed. A negative wheel speed with the vehicle in a forward gear would indicate that the vehicle is rolling backwards and the controller may be arranged to inform the torque calculator that more torque is required by the transmission and torque converter to hold the vehicle in place when facing upward on a hill.

When the engine is in cruise control, the same type of skip fire control may be used to deliver the desired engine torque. When the engine is in cruise control, the torque calculator may be arranged to determine the requested torque based on inputs from the cruise controller (e.g., step 250 in FIG. 2) and the skip fire controller may be arranged to deliver the cruise controller requested torque by controlling the firing fraction in the described manner. When transitory events occur that impact the desired engine torque (as for example gear shifting), the control can seamlessly transition to the appropriate control mode. Using the gear shifting example, the firing fraction is altered appropriately during the gear shifting operation, and when the shift is completed, the operating mode may be returned to cruise control such that the desired torque and the resulting firing fraction determinations may thereafter be made based on inputs from the cruise controller.

In the examples provided above, the alterations in the firing fraction have been described primarily in the context of an engine that is already running in skip fire mode. However, this is not a requirement. Rather, torque reductions may readily be implemented using firing fraction control even when the engine is normally operating in a conventional (e.g. all cylinder firing mode) or a variable displacement mode in which only a fixed set of the working chambers are operating. Thus, referring to FIG. 2, if an engine is operating in a conventional mode 203 when a transmission shift or other transitory torque request is made, the engine can immediately be transitioned to the appropriate skip fire mode (e.g., step 230 for transmission shifting) and the appropriate firing fraction can be delivered in exactly the same manner as previously described. When the shifting operation is completed, the control may be returned to the conventional operating mode 203.

One advantage of the described firing fraction management based approach to handling transitory changes in the requested torque is that the desired torque changes can be delivered almost immediately without the need to significantly alter other engine settings (such as throttle position, valve timing, spark advance, fuel charge for fired cylinders, etc.) which impact fuel efficiency or emissions during the transitory event. Maintaining substantially the same engine settings also allows the previous operating state to be almost immediately restored. However, there are times when it will be desirable to alter selected engine settings (such as spark timing, valve timing, mass air charge and the associated fuel charge, etc.) in conjunction with the change in firing fraction to accomplish specific control objectives. One such example is described above where the spark timing (or other engine settings) may be changed to more quickly alter the effective torque output or to more precisely control a torque reduction.

In other applications it may be desirable to alter the mass air charge (e.g., by altering throttle position or valve timing) and/or other engine settings/parameters during a transitory event. This can be done to smooth or vary the total torque output during a transition, or it may be done for external control purposes. By way of example, when the engine settings after a transitory event are expected to be different than the engine settings at the beginning of the transitory event, it may be desirable to effect that change during the transitory event so that the engine settings are at the target settings at the end of the transitory event. One such example is during a transmission shift during all cylinder operation where the desired manifold pressure (or mass air charge) after a shift may be different than the desired manifold pressure immediately prior to the shift. In such cases, the manifold pressure can be changed to (or close to) the target pressure during the shift operation. Having the manifold pressure at close to the desired target pressure at the end of the shift operation helps reduce or avoid the power lag that can occurs at the end of a shift due to manifold refilling dynamics.

It is possible that multiple torque modification events could be requested at the same time (e.g., transmission gear shifting and traction control). To handle such circumstances the mode determining block 226 may be arranged to establish the appropriate mode priorities and/or appropriate hybrid control may be used.

It should be appreciated that the flow chart of FIG. 2 is provided primarily for illustrative purposes. Therefore, it should be appreciated that some of the described steps may be eliminated or reordered and others may be added. Further, this figure shows only one possible control approach and the described firing fraction control may be achieved using a wide variety of other approaches.

As previously mentioned, in skip fire control, there is normally a delay between the time a decision is made to skip or fire a particular cylinder which allows proper air management, fueling and/or deactivation of the cylinder. The length of the delay will vary with implementation, but delays on the order of two rotations of the crankshaft are not uncommon. Therefore, there is normally a delay between deciding to skip a cylinder and the actual lack of torque from that cylinder. In many implementations, the decision to skip or fire will be made before the intake valve opens, but the generation or absence of torque does not occur until after the intake and compression strokes. However, there are techniques that can be used to even more quickly reduce torque output by utilizing the concept of a "gas spring". Specifically, we can more rapidly decrease the torque, by leaving both the exhaust valve and the intake closed after combustion. This can be done virtually instantly. Using a high pressure exhaust spring approach, the exhaust and intake valve(s) associated with fired cylinders may immediately be deactivated when a decrease of torque is requested. When the exhaust valve(s) and the intake valve are held closed are closed, any gases that have been combusted (or subsequently are combusted) in the associated cylinder(s) will be recompressed, which has the effect of at least partially cancelling out the torque from the power stroke. Thus, high pressure springs can be used to almost immediately cut the engine torque in control situations where such a response is deemed desirable.

Figure 4:
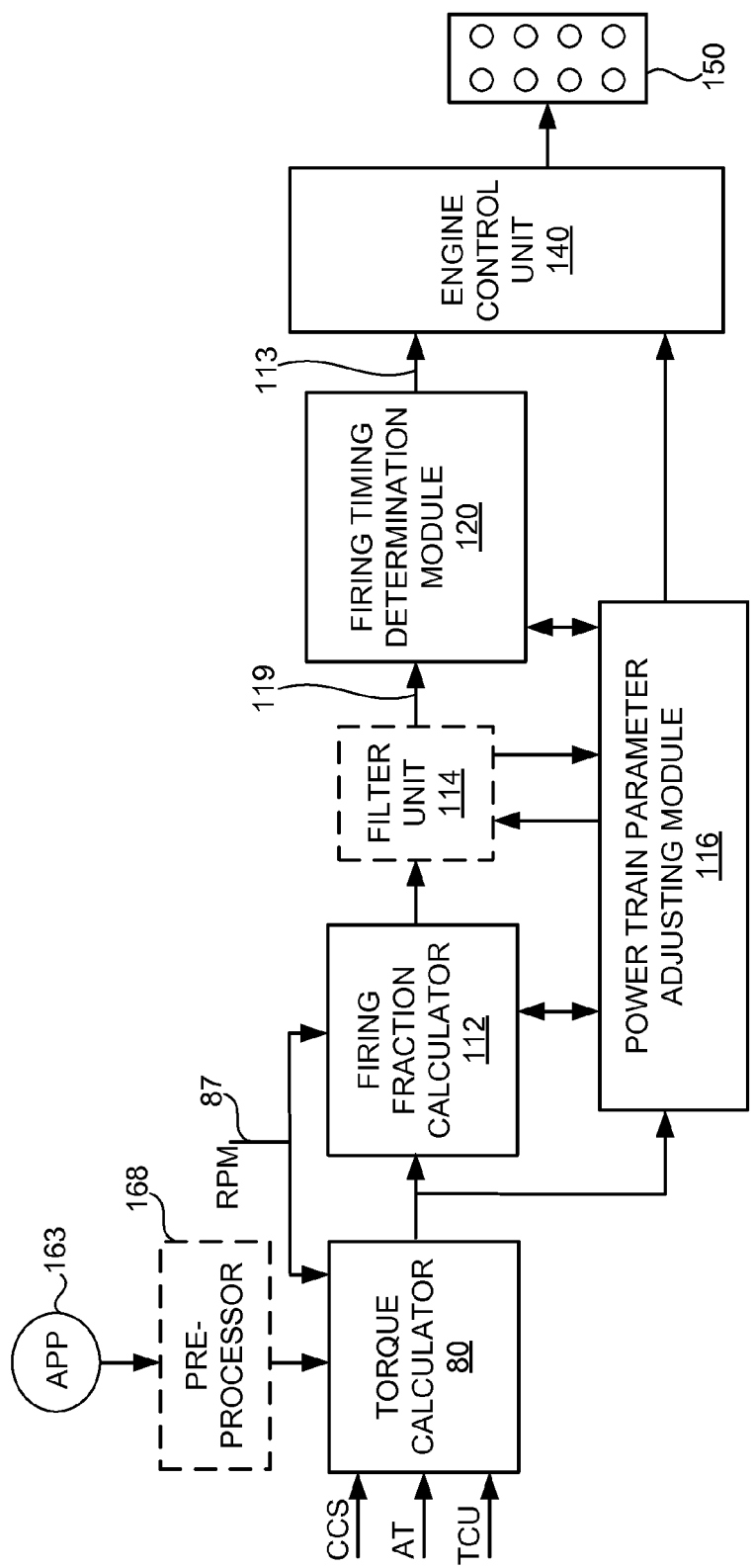
FIG. 4 is a block diagram of another exemplary skip fire engine controller.

Referring next to FIG. 4, another skip fire engine controller suitable for implementing the described firing fraction management will be described. In this embodiment, the engine controller 100 includes a skip fire controller 110 arranged to work in conjunction with an engine control unit (ECU) 140.

In other embodiments, the functionality of the skip fire controller 110 may be incorporated into the ECU 140. Indeed incorporation of the skip fire controller into the ECU is expected to be the most common implementation. The illustrated skip fire controller 100 includes a torque calculator 80, a firing fraction calculator 112, a filter unit 114, a power train parameter adjusting module 116, and a firing timing determining module 120. The torque calculator 80 receives a number of input signals that are appropriate for determining the desired engine torque at any given time as previously described. In FIG. 4 an optional preprocessor 168 may modify the accelerator pedal signal prior to delivery to the skip fire controller 110. However, it should be appreciated that in other implementations, the accelerator pedal position sensor 163 may communicate directly with the torque calculator 80.

The firing fraction calculator 112 receives requested torque signal 81 from the torque calculator 80 and other inputs such as engine speed and various engine (such as mass air charge, etc.) and/or environmental conditions that are useful in determining the torque generated by each firing and therefore the appropriate firing fraction to deliver the requested torque under the current operating conditions. The firing fraction calculator determines a skip fire firing fraction that would be appropriate to deliver the desired output under selected engine operating conditions. The firing fraction is indicative of the fraction or percentage of firings under the current (or directed) operating conditions that are required to deliver the desired output.

There are a number of factors that may influence the desired firing fraction. These typically include the requested torque, engine speed (e.g. RPM) and other selected power train operating parameters such as mass air charge (MAC), the current transmission gear, etc. and potentially various environmental conditions such as ambient pressure or temperature. The firing fraction determining unit 112 is arranged to determine the desired firing fraction based on such factors and/or any other factors that the skip fire controller designer may consider important. By way of example, a few suitable firing fraction determining units are described in co-pending application Nos. 61/640,646 filed Apr. 30, 2012, and concurrently filed application No. 61/682,065, which are both incorporated herein by reference.

In some preferred embodiments, the firing fraction may be determined based on the percentage of optimized firings that are required to deliver the driver requested engine torque (e.g., when the cylinders are firing at an operating point substantially optimized for fuel efficiency). However, in other instances, different level reference firings, firings optimized for factors other than fuel efficiency, the current engine settings, etc. may be used in determining the appropriate firing fraction.

In the illustrated embodiment, an optional power train parameter adjusting module 116 is provided that cooperates with the firing fraction calculator 112. The power train parameter adjusting module 116 directs the ECU 140 to set selected power train parameters appropriately to insure that the actual engine output substantially equals the requested engine output at the commanded firing fraction. By way of example, the power train parameter adjusting module 116 may be responsible for determining the desired mass air charge (MAC) and/or other engine settings that are desirable to help ensure that the actual engine output matches the requested engine output. Of course, in other embodiments, the power train parameter adjusting module 116 may be arranged to directly control various engine settings.

The firing timing determining module 120 is arranged to issue a sequence of firing commands (e.g., drive pulse signal 113) that cause the engine to deliver the percentage of firings dictated by a commanded firing fraction 119. The firing timing determining module 120 may take a wide variety of different forms. By way of example, sigma delta convertors work well as the firing timing determining module 120. A number of the assignee's patents and patent applications describe various suitable firing timing determining modules, including a wide variety of different sigma delta based converters that work well as the firing timing determining module. See, e.g., U.S. Pat. Nos. 7,577,511, 7,849,835, 7,886,715, 7,954,474, 8,099,224, 8,131,445, 8,131,447 and application No. 61/672,144, each of which is incorporated herein by reference. The sequence of firing commands (sometimes referred to as a drive pulse signal 113) outputted by the firing timing determining module 120 may be passed to an engine control unit (ECU) or combustion controller 140 which orchestrates the actual firings.

In the embodiment illustrated in FIG. 4, the output of the firing fraction calculator 112 is optionally passed through a filter unit 114 before it is delivered to the firing timing determining module 120. The filter unit 114 is arranged to mitigate the effect of any step change in the commanded firing fraction such that the change in firing fraction is spread over a longer period. This "spreading" or delay can help smooth transitions between different commanded firing fractions and can also be used to help compensate for mechanical delays in changing the engine parameters. When transitory events occur, the filter has the effect of delaying the implementation of a step change in the engine output. If the nature of the transitory event is such that the filter imposed delays are acceptable, smoother operation can be obtained by using such a filter. However, if the nature of the transitory event is such that a quicker response is desired (as for example, during traction control events), it is sometimes desirable to bypass the filter unit 114 to provide a quicker response. More generally, some engine controllers have separate "fast path" and "slow path" approaches for managing transitory torque changes. In such applications, the filters can be bypassed for "fast path" responses and used in "slow path" changes.

In the illustrated embodiment, the filter unit 114 may include a first filter that smoothes the abrupt transition between different commanded firing fractions to provide better response to engine behavior and so avoid a jerky transient response. In some circumstances, a change in the commanded firing fraction and/or other factors will cause the power train adjusting module 116 to direct a corresponding change in the engine (or other power train) settings (e.g., throttle position which may be used to control manifold pressure/mass air charge). To the extent that the response time of the first filter is different than the response time(s) for implementing changes in the directed engine setting, there can be a mismatch between the requested engine output and the delivered engine output. Indeed, in practice, the mechanical response time associated with implementing such changes is much slower than the clock rate of the firing control unit. For example, a commanded change in manifold pressure may involve changing the throttle position which has an associated mechanical time delay. Once the throttle has moved there is a further time delay to achieve of the desired manifold pressure. The net result is that it is often not possible to implement a commanded change in certain engine settings in the timeframe of a single firing opportunity. If unaccounted for, these delays would result in a difference between the requested and delivered engine outputs. The filter unit 114 may also include a second filter to help reduce such discrepancies. More specifically, the second filter may be scaled so its output changes at a similar rate to the engine behavior; for example, it may substantially match the intake manifold filling/discharge dynamics. The filters within the filter unit 114 may be constructed in a wide variety of different manners.

The firing fraction calculator 112, the filter unit 114, and the power train parameter adjusting module 116 may take a wide variety of different forms and their functionalities may alternatively be incorporated into an ECU, or provided by other more integrated components, by groups of subcomponents or using a wide variety of alternative approaches. In various alternative implementations, these functional blocks may be accomplished algorithmically using a microprocessor, ECU or other computation device, using analog or digital components, using programmable logic, using combinations of the foregoing and/or in any other suitable manner.

Although not required in all implementations, in many implementations the determination of the appropriate firing fraction and individual firings decisions may be made on a firing opportunity by firing opportunity basis. That is, in the context of the firing fraction calculator 112, the currently desired firing fraction can be re-determined before each firing opportunity. Facilitating such dynamic tracking of the desired firing fraction allows the controller to be particularly responsive to changing demands while maintaining the benefits of skip fire operation.

Although only a few embodiments have been described in detail, it should be appreciated that the invention may be implemented in many other forms without departing from the invention. For example, although a few particular skip-fire engine controllers that are suitable for utilizing the described firing fraction control have been described, and others are described in some of the incorporated patents, it should be appreciated that the described firing fraction control can be used with a wide variety of different skip-fire controllers and it is not limited to use with the described classes of skip fire controllers.

Some of the examples in the incorporated patents and patent applications contemplate an optimized skip fire approach in which the fired working chambers are fired under substantially optimal conditions (thermodynamic or otherwise). For example, the mass air charge introduced to the working chambers for each of the cylinder firings may be set at the mass air charge that provides substantially the highest thermodynamic efficiency at the current operating state of the engine (e.g., engine speed, environmental conditions, etc.). The described control approach works very well when used in conjunction with this type of optimized skip fire engine operation. However, that is by no means a requirement. Rather, the described control approach works very well regardless of the conditions that the working chambers are fired under.

As explained in some of the referenced patents and patent applications, the described firing control unit may be implemented within an engine control unit, as a separate firing control co-processor or in any other suitable manner. In view of the foregoing, it should be apparent that the present embodiments should be considered illustrative and not restrictive and the invention is not to be limited to the details given herein, but may be modified within the scope of the appended claims.

What is claimed is:

1. An engine controller arranged to:
    direct operation of an engine to deliver a requested engine output;
    direct skip fire operation of the engine during a transmission shift event to deliver a transitory engine output that is significantly less than the requested engine output, wherein the difference between the transitory engine output and the requested engine output is provided in significant part by a difference in a percentage of working cycles that are fired during the transmission shift as compared to the percentage of working cycles that are fired immediately prior to the transmission shift; and
    restore the engine output to the requested engine output after the transmission shift event is completed.

2. An engine controller as recited in claim 1 wherein the engine controller is arranged to direct operation of the engine in an all cylinder operating mode to deliver the requested engine output and to direct operation of the engine is a skip fire operating mode to deliver the transitory engine output, wherein in the all cylinder operating mode, substantially all of the working cycles of all of the available working chambers are fired.

3. An engine control as recited in claim 1 wherein the engine controller is further arranged to adjust at least one selected engine setting in conjunction with the change in the percentage of working cycles that are fired to deliver the transitory engine output.

4. An engine controller arranged to:
    direct operation of an engine to deliver a requested engine output;
    direct skip fire operation of the engine during a transmission shift event to deliver a transitory engine output that is less than the requested engine output, wherein the difference between the transitory engine output and the requested engine output is provided in part by a difference in a percentage of working cycles that are fired during the transmission shift as compared to the percentage of working cycles that are fired immediately prior to the transmission shift; and
    restore the engine output to the requested engine output after the transmission shift event is completed;
    wherein the engine controller is further arranged to, in selected circumstances, hold a position of a throttle used to regulate airflow to the engine's working chambers substantially constant throughout the transitory event at a position substantially the same as the throttle position used to deliver the requested engine output immediately prior to the transitory event.

5. An engine controller arranged to:
    direct operation of an engine to deliver a requested engine output;
    in response to a transitory event, determine a desired transitory engine output based on the nature of the transitory event, there being a difference between the desired transitory engine output and the requested engine output;
    direct skip fire operation of the engine during the transitory event to deliver the desired transitory engine output, wherein the difference between the desired transitory engine output and the requested engine output is accounted for in part by a difference in a percentage of available working cycles that are fired during the transitory event as compared to the percentage of available working cycles that are fired immediately prior to the transitory event; and
    restore the engine output to the requested engine output after the transitory event is completed.

6. An engine controller as recited in claim 5 wherein the requested engine output is delivered using an all cylinder operating mode in which substantially all of the working cycles of all of the available working chambers are fired and the transitory engine output is delivered using a skip fire operating mode.

7. An engine controller as recited in claim 5 wherein both the requested engine output and the transitory engine output are delivered using a skip fire operating mode.

8. An engine controller as recited in claim 5 wherein the transitory event is a transmission shift.

9. An engine controller as recited in claim 5 wherein the engine controller is further arranged to hold a position of a throttle used to regulate airflow to the engine's working chambers substantially constant throughout the transitory event at a position substantially the same as the throttle position used to deliver the requested engine output immediately prior to the transitory event.

10. An engine controller as recited in claim 5 wherein the requested engine output may vary between the beginning and the end of the transitory event.

11. An engine controller as recited in claim 5 wherein the engine controller is further arranged to adjust at least one selected engine setting in conjunction with the change in the percentage of working cycles that are fired to deliver the transitory engine output.

12. An engine controller as recited in claim 5 wherein the requested engine output varies over time such that the requested engine output that the engine is restored to at the end of the transitory event may be different than the requested engine output at the beginning of the transitory event.

13. An engine controller as recited in claim 5 wherein the cylinders associated with skipped working cycles are deactivated during the skipped working cycles.

14. An engine controller arranged to:
    direct operation of an engine to deliver a requested engine output;
    in response to a transitory event, determine a desired transitory engine output based on the nature of the transitory event, there being a difference between the desired transitory engine output and the requested engine output;
    direct skip fire operation of the engine during the transitory event to deliver the desired transitory engine output, wherein the difference between the desired transitory engine output and the requested engine output is accounted for in part by a difference in a percentage of available working cycles that are fired during the transitory event as compared to the percentage of available working cycles that are fired immediately prior to the transitory event; and
    restore the engine output to the requested engine output after the transitory event is completed; and
    wherein the transitory event is selected from the group consisting of: a traction control event; a stability control event; and a wheel hop mitigation event.

15. A method of making a transitory change to an engine output comprising:
    directing operation of an engine to deliver a requested engine output;
    in response to a transitory event, determining a desired transitory engine output based on the nature of the transitory event, there being a difference between the desired transitory engine output and the requested engine output;
    directing skip fire operation of the engine during the transitory event to deliver the desired transitory engine output, wherein the difference between the desired transitory engine output and the requested engine output is accounted for in part by a difference in a percentage of available working cycles that are actually fired; and
    restoring the engine output to the requested engine output after the transitory event is completed.

16. A method as recited in claim 15 wherein the requested engine output is delivered using an all cylinder operating mode and the transitory engine output is delivered using a skip fire operating mode.

17. A method as recited in claim 15 wherein both the requested engine output and the transitory engine output are delivered using a skip fire operating mode.

18. A method as recited in claim 5 wherein the transitory event is a transmission shift.

19. A method as recited in claim 15 wherein the transitory event is selected from the group consisting of: a traction control event; a stability control event; and a wheel hop mitigation event.

20. A method as recited in claim 15 wherein a position of a throttle used to regulate airflow to the engine's working chambers is held substantially constant throughout the transitory event at a position substantially the same as the throttle position used to deliver the requested engine output immediately prior to the transitory event.

21. A method as recited in claim 15 wherein the desired transitory engine output varies over the course of the transitory event and the variations in the desired transitory engine output are accounted for in significant part by a difference in a percentage available working cycles that are actually fired.

22. A method as recited in claim 15 wherein the requested engine output varies over time such that the requested engine output that the engine is restored to at the end of the transitory event may be different than the requested engine output at the beginning of the transitory event.

23. A method as recited in claim 15 wherein the cylinders associated with skipped working cycles are deactivated during the skipped working cycles.

* * * * *

UNITED STATES PATENT AND TRADEMARK OFFICE
CERTIFICATE OF CORRECTION

Page 1 of 1

PATENT NO. : 9,120,478 B2
APPLICATION NO. : 13/963744
DATED : September 1, 2015
INVENTOR(S) : Carlson et al.

It is certified that error appears in the above-identified patent and that said Letters Patent is hereby corrected as shown below:

In the Claims

Column 18, Line 24, Claim 18, change "5" to --15--.

Signed and Sealed this
Sixteenth Day of February, 2016

Michelle K. Lee
*Director of the United States Patent and Trademark Office*